United States Patent [19]

Kessler

[11] Patent Number: 4,841,411
[45] Date of Patent: Jun. 20, 1989

[54] ELECTRICAL CAPACITORS HAVING LOW CAPACITANCE TOLERANCES AND METHOD FOR THE MANUFACTURE THEREOF

[75] Inventor: Hartmut Kessler, Regensburg, Fed. Rep. of Germany

[73] Assignee: Siemens Aktiengesellschaft, Munich, Fed. Rep. of Germany

[21] Appl. No.: 187,962

[22] Filed: Apr. 29, 1988

[30] Foreign Application Priority Data

May 12, 1987 [DE] Fed. Rep. of Germany ....... 3715810

[51] Int. Cl.⁴ .................... H01G 1/015; H01G 13/00
[52] U.S. Cl. ..................................... 361/323; 29/25.42
[58] Field of Search ............... 29/25.42; 361/323, 324

[56] References Cited

U.S. PATENT DOCUMENTS

| | | | |
|---|---|---|---|
| 3,252,830 | 5/1966 | Cummin | 29/25.42 X |
| 3,614,561 | 10/1971 | Behn | 29/25.42 X |
| 3,670,378 | 6/1972 | Behn et al. | 29/25.42 |
| 3,728,765 | 4/1973 | Behn et al. | 29/25.42 |
| 3,731,354 | 5/1973 | Rayburn | 29/25.42 |
| 4,240,127 | 12/1980 | Fanning et al. | 361/304 |
| 4,439,814 | 3/1984 | Rhodes | 29/25.42 X |
| 4,441,139 | 4/1984 | Bernard | 29/25.42 X |
| 4,563,724 | 1/1986 | Behn | 361/306 |
| 4,639,832 | 1/1987 | Behn | 361/306 |

FOREIGN PATENT DOCUMENTS

| | | |
|---|---|---|
| 0144857 | 11/1984 | European Pat. Off. . |
| 0201771 | 4/1986 | European Pat. Off. . |
| 1764542 | 11/1972 | Fed. Rep. of Germany . |
| 1764541 | 3/1973 | Fed. Rep. of Germany . |
| 1764548 | 12/1978 | Fed. Rep. of Germany . |
| 2831736 | 1/1980 | Fed. Rep. of Germany . |
| 3435908 | 4/1985 | Fed. Rep. of Germany . |
| 3342329 A1 | 5/1985 | Fed. Rep. of Germany . |
| 2497394 | 7/1982 | France . |
| 2519429 | 7/1983 | France . |

*Primary Examiner*—Donald A. Griffin

[57] ABSTRACT

An electrical capacitor and manufacturing method therefore provides at least two dielectric bands each with a metal coat on at least one side to form stacked film, or wound capacitors. Changes in capacitance which are the result of fluctuations in dielectric ply thickness are compensated by corresponding opposite modification of the overlap of the layers. The compensation ensues by a de-metallization device that makes the metal coating wider or narrower on the basis of a control direction depending upon greater or lesser ply thickness.

23 Claims, 2 Drawing Sheets

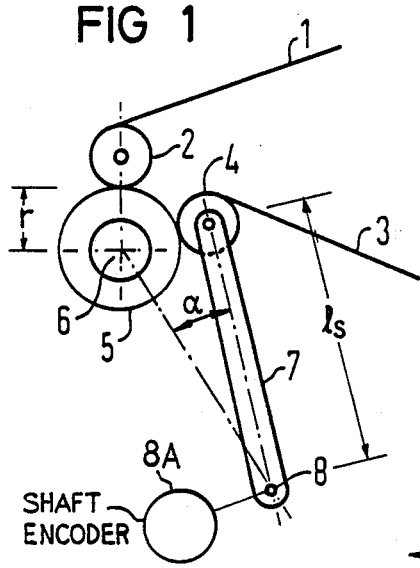
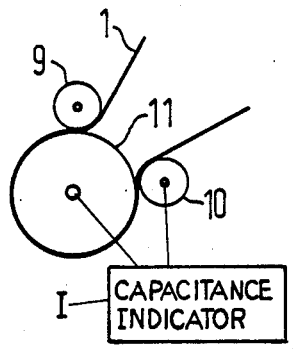
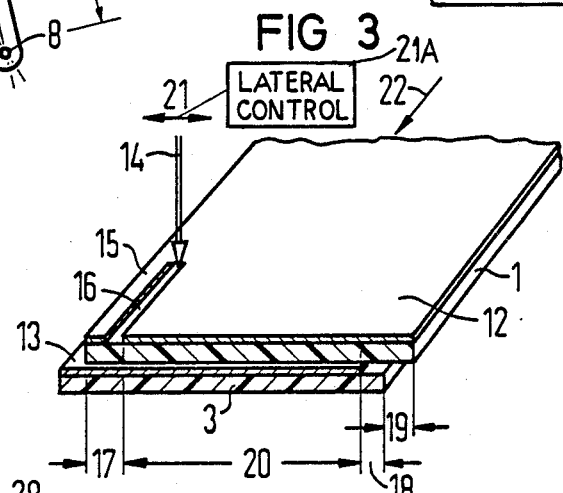
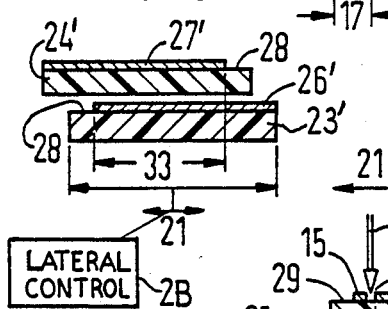
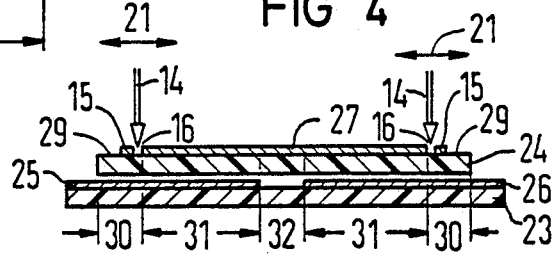

ELECTRICAL CAPACITORS HAVING LOW CAPACITANCE TOLERANCES AND METHOD FOR THE MANUFACTURE THEREOF

BACKGROUND OF THE INVENTION

1. Field of the Invention

The present invention relates generally to an electrical capacitor and a method for its manufacture. More specifically, the invention is directed to an electrical capacitor composed of a stack of at least two dielectric plies of plastic, for example provided with regenerably thin metal coatings on at least one side. Metal-free insulating strips are present in alternation from ply to ply in the proximity of different edge sides and at a distance therefrom. The metal coatings are contacted with opposite polarity from ply to ply by metal layers applied to the side edges of the stack.

The invention is also directed to an electrical capacitor composed of a winding of at least two dielectric plies of plastic or paper provided with regenerably thin metal coatings on at least one side. Metal-free insulating strips are present in alternation from ply to ply in the proximity of different side edges and at a distance therefrom. The metal coatings are contacted with opposite polarity from ply to ply by metal layers applied to the side edges of the wound capacitor.

The invention of the present application is also directed to a method for manufacturing an electrical capacitor wherein dielectric bands of plastic or paper for example, that are metallized on one side are wound on a winding drum and then cut into individual capacitors for manufacturing a stacked capacitor. Alternately, the metallized dielectric bands are wound on a winding spindle for manufacturing a wound capacitor.

Further, the invention is directed to a method for manufacturing an electrical capacitor wherein a dielectric band is provided as a mother band having a width amounting to a multiple of a width required for individual capacitors. The mother band is first provided with metal strips extending in a longitudinal direction between which are situated metal-free strips of substantially equal width and lying substantially equally spaced from one another. The mother band is divided into individual bands along cut lines and the individual bands are wound to form capacitors.

2. Description of the Related Art

Film capacitors are disclosed, for example, in German Patent No. 17 64 548 and corresponding U.S. Pat. No. 3,614,561. Manufacturing methods for film capacitors are disclosed in German Patent No. 17 64 541 and corresponding U.S. Pat. Nos. 3,728,765 and 3,670,378.

Another type of film capacitor is disclosed in German Published Application No. 33 42 329, as well as in corresponding European Patent No. 0 144 857 and U.S. Pat. No. 4,563,724. Appertaining manufacturing methods for this type of film capacitor are also disclosed in these references.

Electrical wound capacitors and methods of manufacture have been known for many years. A special form of wound capacitor is disclosed in European Published Application No. 0 201 771 and corresponding to U.S. Pat. No. 4,639,832.

It is well known that for manufacturing electrical capacitors, plastic foils are used as dielectric plies provided with regenerably thin metal coatings situated thereon to provide a broad initial foil with longitudinal metal strips and metal-free insulating strips situated therebetween. Such broad initial foils are then cut to produce individual bands. Two cut directions for the broad band extend, first, through the center of a longitudinal metal strip and, second, through the center of the insulating strips. However, it is also known from German Published Application No. 28 31 736 to place longitudinal cuts so that the metal-free insulating strips are offset by a slight amount from the edge of the resulting individual band.

The capacitance of a film capacitor is calculated from the equation $C = \epsilon \epsilon_0 n A/d$ where $A = uL$. In this equation, $C$ is the capacitance, $\epsilon$ is the electrical constant, or relative permittivity, of the dielectric used in the capacitor which is, for example, paper or plastic foil, $\epsilon_0$ is the dielectric constant of a vacuum or permittivity of free space, $n$ is the number of foil plies in the film capacitor lying one on top of another and having an area $A$. The area $A$ represents the effective field area, i.e. the area between the metallizations or electrodes that is occupied by the electrical field. The area $A$ is calculated as the product of length $L$ and lateral overlap $u$ of the two electrodes. $d$ is the thickness of the dielectric plies or foils.

It may be seen from the above equation that the capacitance $C$ varies inversely proportionally to the thickness $d$ of the dielectric plies for a prescribed capacitor length $L$ and lateral overlap $u$. The thickness of the dielectric plies or foils typically fluctuate on the order of magnitude of from 5 to 15%, so that variations of capacitance values of the same order of magnitude are the result in capacitors manufactured with a winding of constant length. As a rule, however, capacitors which have a narrower range of capacitance variation are desired. For example, capacitors wherein 99% of those manufactured have capacitance values that lie within a tolerance range of at most ±5%, and optimally in a range of only ±3%, from a rated or specified capacitance value.

To achieve this accuracy, it has hitherto been standard practice to calculate the actual foil thickness $d$ in wound capacitors from a number $z_a$ of turns wound on to the capacitor, the foil lengths $aL$ which have been wound, and the spindle diameter $d_o$ (which corresponds to the initial diameter of the capacitor winding). Either the ultimate number $z_o$ of windings is calculated or the foil length $L_o$ is calculated required is calculated for this foil thickness to achieve the intended capacitance. Such figures can also be derived from a table.

It is also known to measure the capacitance of the winding as it is being formed during manufacture and to conclude the winding process when the rated capacitance value is reached.

In stacked film capacitors in which individual capacitors are cut from an annular mother capacitor by sawing, it is known to achieve the correct value of capacitance by controlling and varying the cutting length during cutting into individual capacitors. The point of reference for setting the cutting length is either found from the measured capacitance of a capacitor having a known cut length which has already been cut off from the mother capacitor, or from the capacitance of the mother capacitor itself (see, for example, German Patent No. 1 764 542).

In summary, it can be stated that it is known to achieve a desired or rated capacitance by adjusting the length of the wound foils or of the finished, cut value capacitor. One problem which arises with the known methods is that, in addition to volume changes of the capacitor due to changes in foil thickness, a volume change in the same direction is also added by variation in length. In other words, a capacitor that is thicker than usual due to thicker foils must also be thicker (or longer) than usual in order to compensate for the diminshed capacitance provided by the thicker foils. The reverse is true for thinner foils or plies. Such different sizes of capacitors lead to considerable production difficulties during handling and mounting, and particularly during integration of the capacitors into pots or capacitor cases.

Application of the methods which are known for producing a narrow tolerance capacitor are not applicable to capacitors of the above-mentioned European Patent No. 0 144 857 and corresponding U.S. Pat. No. 4,639,832. The length of the resulting individual capacitors are already determined during winding by treating the interrupted free edges thereof with a laser beam in accordance with the disclosure.

SUMMARY OF THE INVENTION

An object of the present invention is to provide capacitors and methods for their manufacture which have narrow capacitance tolerances and which have lengths that are independent of fluctuations in the thickness of the dielectric material of which the capacitors are formed.

To achieve this and other objects of the invention, a stacked capacitor is inventively characterized in that fluctuations $\Delta d$ from a prescribed intended or rated thickness $d$ of the dielectric plies are compensated by a corresponding modification $\Delta u$ of the specified or rated overlap $u$ of the metal coatings in accordance with an equation $C = \epsilon \epsilon_0 nL (u+\Delta u)/(d+\Delta d)$. In this equation, $C$ is the capacitance of the capacitor, $\epsilon$ is the dielectric constant, or permittivity of the dielectric material used, $\epsilon_o$ is the dielectric constant, or permittivity, of free space n is the number of plies of the film capacitor that situated above one another, L is the length of the film capacitor defined by the parting cut for the stacked capacitor from the mother capacitor, u is the lateral rated or specified overlap of the plies, $\Delta u$ is the modification of the lateral specified or rated overlap, d is the intended or rated dielectric thickness of the plies, and $\Delta d$ is the fluctuation from the rated or intended dielectric thickness of the plies.

Furthermore, a wound capacitor is inventively characterized in that fluctuations $\Delta d$ from the prescribed rated thickness d of the dielectric plies are compensated by corresponding modifications $\Delta u$ of the rated overlap u of the metal coatings according to the equation $C = \epsilon\epsilon_o nL(u+\Delta u)/(d+\Delta d)$, wherein C is the capacitance of the capacitor, $\epsilon$ is the dielectric constant, or permittivity, of the dielectric material used, $\epsilon_o$ is the dielectric constant or permittivity of free space, n is the number of plies of the wound capacitor situated above one another, L is the circumference of the capacitor winding, u is the lateral rated overlap of the plies, $\Delta u$ is the modification of the lateral rated overlap, d is the rated dielectric thickness, and $\Delta d$ is the fluctuation from the rated dielectric thickness.

An advantage of the present invention is that a capacitor in accordance with the principles of this invention has a capacitance value lying in an extremely narrow range of tolerance of less then ±5%. Likewise, the outer dimensions of such capacitor, given identical values of capacitance and the same dielectric material, are practically the same. Thus, integration into pots or housings is simplified insofar as the dimensions are based on practically identical capacitor sizes.

Compared to known capacitors, the capacitor of the present invention, and in particular a capacitor manufactured in accordance with one of the methods recited below, has the property that the overlap of the individual coatings is not constant but that greater or lesser lateral offsets are provided depending upon the fluctution of the foil or ply thickness. Furthermore, all capacitors of a defined capacitance have the same length.

To achieve approximately identical volumes in capacitors manufactured as mass produced products, it is advantageous that the number n of plies lying one over another be selected inversely proportional to $(d+\Delta d)$ and that the overlap $(u+\Delta u)$ be selected proportional to $(d+\Delta d)^2$. In otherwords, that the overlap be quadratically proportional to the thickness. This results in $\Delta u/u$ being approximately equal to $2\Delta d/d$. Thus, overlap modifications that are quadratically proportional to the thickness variations are useful where capacitor volume is to be maintained constant.

An advantageous method for manufacturing electrical stacked or wound capacitors is characterized in that the thickness of at least one of the at least two bands provided with metal coatings at one side is capacitively measured before being wound onto the capacitor winding. The overlap u of the metal coatings is increased or decreased by an amount $\Delta u$ corresponding to the fluctuation $\Delta d$ of the band thickness d from the prescribed rated value as determined by the capacitive measurement. The capacitance measurement of the thickness d, for example, is performed by conducting the band over an electrically conductive drum so that the drum serves as one electrode and the metal coating on the band serves as the other electrode for the capacitance measurement. Variations in the capacitance value are thus used to determine fluctuations in the ply thickness.

A further advantageous method for manufacturing electrical stacked or wound capacitors is characterized in that a plurality of plies or foil bands are wound on top of one another and the overall thickness of these plies is compared to a rated thickness. The deviation from the rated capacitance to be expected as a result of differences in thickness from the rated value is compensated by modifying the lateral, rated overlap u of the plies yet to be wound on in order to achieve the ultimate thickness. This correction procedure can also be applied several times during the manufacturing process by measuring for intermediate rated thicknesses.

An advantageous alternative for manufacturing an electrical capacitor is characterized in that the width of the metal coating of at least one of the at least two bands is set by a de-metallization means so that the lateral overlap $u+\Delta u$ is either linearly or quadratically proportional to the actual band thickness $d+\Delta d$. Another alternative is that during the manufacture of a capacitor, the two bands lying one on top of another are laterally offset so that the lateral overlap $u+\Delta u$ is either linearly or quadratically proportional to the actual band thickness $d+\Delta d$.

A further method for manufacturing electrical stacked or wound capacitors is characterized in that the cut lines for cutting individual bands from a mother band are laterally displaced to a greater or lesser extent depending upon the thickness of the band being cut so that modification of the width of the active metal coating in comparison to the rated width is either linearly or quadratically proportional to the deviation of the band thickness from the rated band thickness. Individual bands thus produced are wound in a known way to form capacitors.

When it is desired that not only the length but also the thickness of the capacitors be constant, then the overlap of the individual foils or plies should be not proportional to the foil thickness but instead be proportional to the square of the foil thickness. The surface region of the metal coating over which the correction measures may occur, of course, is to be larger. Over and above this, both the number of windings or plies as well as the value of the foil thickness is monitored since a constant thickness can only be achieved when the product of foil thickness and the number of windings remains constant. The identification of the foil thickness, of course, can also ensue by means of an apparatus as disclosed in German Published Application No. 34 35 908 which relates to non-contacting measurement of the thickness of material webs of polymer materials.

When the overlap u of the plies or bands is kept proportional to the actual foil thickness d, an advantage deriving from the present invention is that the finished capacitor has a fixed electrode length L that is independent of the foil thickness d. Thus, capacitors that, due to their structural principle, do not permit fine adjustment of the value of capacitance by controllably varying the electrode length nonetheless exhibit only a slight variation in capacitance from unit to unit.

Thus, as can be discerned from the above discussion, the inventive apparatus and method of varying layer overlap proprotionally to layer thickness is applicable to a variety of capacitor types and manufacturing methods. It is foreseen that these principles can also be appied to other capacitor types and capacitor manufacturing methods in addition to those disclosed herein.

BRIEF DESCRIPTION OF THE DRAWINGS

FIG. 1 is a schematic view of an arrangement for conducting thickness measurements of a plurality of wound foil plies;

FIG. 2 is a schematic diagram of an arrangement for performing capacitive thickness measurements of a metallized dielectric foil or ply;

FIG. 3 is a perspective view of two overlapped plies or bands for use in manufacturing a capacitor and showing the formation of a metal-free insulating strip being burned free with a laser beam to vary the lateral overlap in accordance with the present invention;

FIG. 4 is an elevational cross section of a pair of metallized plies having an arrangement of conductive coatings for forming a capacitor having an inner series connection and showing overlap being controlled by burning off the metal coating to form metal-free strips;

FIG. 5 is an elevational cross section of a pair of metallized plies showing lateral overlap controlled by variation of the lateral offset of one of the plies;

DESCRIPTION OF THE PREFERRED EMBODIMENTS

Figure 6:
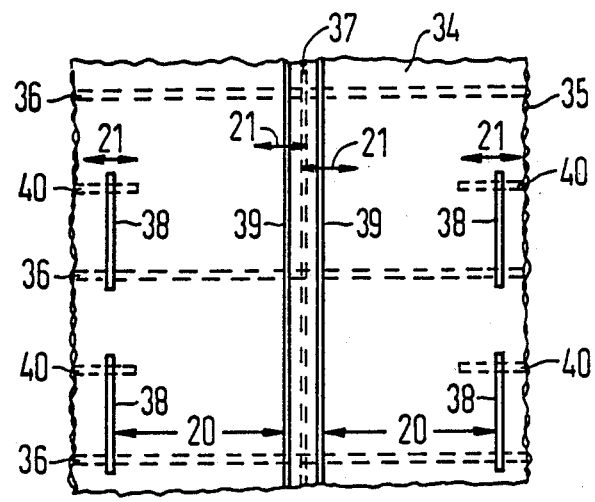
FIG. 6 is a plan view of a pair of metallized plies or foils having metal-free strips burned open with a laser to provide variation in overlap.

In FIG. 1 is shown an arrangement for measuring the thickness of a plurality of plies of metallized bands wound one on top of another. A first band 1 is being conducted around a capstan idler 2 and is being wound on a winding spindle 6 to form a capacitor winding 5. A second band 3 is guided around a second capstan idler 4 and is being wound over the first band 1 onto the capacitor winding 5. The second capstan idler 4 is secured to a rocker arm 7 that is pivotally seated about a pivot point 8. The pivot point 8, for example, is the shaft of an incremental shaft encoder 8A.

As the bands 1 and 3 are wound on the winding spindle 6, the thickness of the capacitor winding 5 constantly increases. The increasing thickness of the capacitor winding 5, which corresponds to an increasing radius r for the spindle 6, causes an angle $\alpha$ between the rocker arm 7 and the broken connecting line shown extending from the center of the winding spindle 6 to the pivot point 8 of the rocker 7 to increase. The increase $\Delta\alpha$ in the angle $\alpha$ is identified, for example, with the incremental shaft encoder 8. When a stacked film capacitor is being manufactured instead of a wound capacitor, the winding spindle 6 is replaced in the illustrated arrangement by a large diameter winding wheel.

In view of he slight thickness of the individual foils or bands 1 and 3, it is expedient to measure the angle $\alpha$ not continuously but in a plurality of steps. For a known rocker length $l_s$, the increase $\Delta r$ of the radius r of the winding becomes $\Delta r = \Delta\alpha l_s$. Since, on the other hand, $\Delta r$ is equal to the product of the band thickness by the number of turns applied since the last measurement of the winding and the number of wound bands (for example, two bands 1 and 3), the effective thickness of the bands can be calculated therefrom.

Deviation of the effective capacitance from the rated or intended capacitance to be expected due to fluctuation of the effective thickness from the rated or specified thickness of the bands is corrected by modifying the overlap of the two bands 1 and 3, as shall be set forth in greater detail hereinafter.

Another possibility for identifying the thickness of the band 1 is shown in FIG. 2. An electrically conductive drum 11 is looped by the band 1 which has been provided with a metal coat on one side. The side of the band 1 which is free of the metal coat lies against the drum 11. A capacitor is formed whose area is defined by the region looped by the band 1, which is determined in part by the position of deflection rollers 9 and 10. The electrode spacing of the resulting capacitor is determined by the thickness of the band 1 which lies between the drum 11 and the metal coat on the ouside of the band 1. The value of the capacitance is determined from a capacitance meter I, for example. Deviation of the measured value of capacitance from a value of capacitance calculated for a rated or nominal band thickness is inversely proportional to the fluctuations of the band thickness. Changes in capacitance of a stacked film or wound capacitor formed fro the band 1 can be anticipated due to the identified fluctuations in band thickness. Such capacitance changes can thereby be compensated by one of the methods set forth below, such as being compensated by modification of the overlap of the layers. The arrangement of FIG. 2 is preferrably arranged in a band travel path just prior to winding of the band to form a capacitor and, thus, provide immediate information on the band thickness. The thickness of each band used to form the capacitor is, of course, measured.

Referring to FIG. 3, a positive method for modifying the overlap is shown when variation in the band thickness is known. Two bands 1 and 3, each of which is provided with a metal coat of, for example, regenerably thin metal 12 and 13 on one side, are placed on top of one another with a lateral offset 19. The lower band 3 has a free edge 18 on which no metal coat 13 is situated. The upper band 1 is passed under a de-metallization means 14 such as, for example, a laser beam directed to evaporate or burn off a strip 16 of the metal coat 12. The band 1 is passed under the de-metallization means 14 in a moving direction 22 of the band so that an insulating edge 17 arises adjacent one side edge of the band 1. A residual strip 15 of the metal coating separated from the metal coat 12 by the strip 16 no longer contributes to the electrode area of the band 1 since it is isolated from the metal coat 12 by the metal-free zone 16. The active part of the metal coatings 12 and 13 is, thus, determined by the overlap 20. When a band thickness is too great (greater than the rated value), the overlap 20 must be made greater (wider). So too, when the band thickness is small (less then the rated thickness value), then the overlap 20 is made smaller (narrower). This is achieved by shifting the de-metallization means 14 in a control direction 21 either toward the left or right as indicated by the arrows. A lateral control 21A effects movement of the laser beam 14 in the control directions 21. The lateral control 21A is operated by the changes detected by the capacitance indicator I or shaft encoder 8A, for example, and compares the thickness to the plies to a rated thickness. Differences are translated into lateral movements.

The overlap 20 is, thus, set on the basis of variation of the width of the insulating edge 17. The free edge 18, by contrast, is invariable and is, for example, produced by a portion of the band being covered during vapor deposition of the metal coat 13 onto the foil or band 3. The bands thus formed with a variable overlap 20 are wound to form capacitors in a known way.

A possible method for manufacturing a capacitor having an internal series connection is shown in FIG. 4. Two metal coats 25 and 26 are separated by a free edge or metal-free space 32 situated on a band 23. A further band 24 is wound with the band 23. A metal coat 27 on the further band 24 has a width that is set by the de-metallization means 14 so that anticipated changes in capacitance of the finished capacitor due to fluctuations in band thickness are compensated by variable overlaps 31. The lateral positions of the de-metallization means 14 are also controlled by lateral control (con shown). The distance from a free edge 29 to the newly formed metal-free zone 16 is of such size that residual strips 15 of the metal coating 27 remain even during a relatively great excursion of one or both of the de-metallization means 14 toward the left or right. The electrically ineffective free edge is the overall free edge 30 which is variable dependent on the thickness of the bands 23 and 24. The overall overlap is controlled to be proporational to the band thickness $u = (u_1 \times u_2)(u_1 + u_2)$, where $u_1 =$ one of the overlaps 31 and $u_2 =$ the other one of the overlaps 31.

Referring to FIG. 5, free edges 28 are defined in width on the bands or foils 23' and 24'. A desired low tolerance or low variation capacitor is formed when the metal coats 26' and 27' on the foils 23' and 24' are laterally offset relative to one another in a control direction 21 so that an overlap 33 is made proportionately greater for thicker bands and proportionately smaller for thin bands. In other words, the lateral position of the band 23 is changed relative to the band 24 to cause a resulting change the overlap 33. Thus, the capacitor which arises has a low tolerance or capacitance variation. A lateral control 21B is used to change the relative positions of the bands 23' and 24'.

In FIG. 6 is shown an advantageous method for manufacturing low-induction capacitors of the type disclosed, for example, in European Patent No. 1 144 857. Two bands 34 and 35 are provided with metal coats on one side and lie on top of one another. Each of the bands 34 and 35 have wavy cut side edges. Only those parts of the band 35 that are not covered by the wavy cut edge of the top band 34 can be seen. The length of individual capacitors formed from the bands 34 and 35 are determined by saw lines or cut lines 36. The finished winding is divided along the longitudinal cut line 37. The dimensions of the individual capacitor are, thus, determined by the cut lines 36 and 37 and, as a result of the capacitor's structure, are relatively invariable. As is known, a low induction capacitor is characterized by metal-free zones 38 that are produced by a laser to alternately lie between slots 40 and one of the saw lines 36 from dielectric ply to dielectric ply, so that the metal coatings are contacted in alternation.

It is within the framework of the present invention that laser produced metal-free zones 39 be shifted toward the right or left as indicated by control directions 21 depending upon the band thickness so that a different overlap of the bands 34 and 35 lying one on another is achieved. It is likewise within the scope of the invention to vary the active width of the metal coating situated on the band 34 and, thus, to vary the overlap between the bands 35 and 34 by providing a metal-free zone 39. The active metal coat region is defined by the overlap 20 between the free zone 38 and the free zone 39 which is correspondingly enlarged for greater band thicknesses then the rated band thickens and appropriately diminished when the band thickness is less then the nominal or rated band thickness.

Figure 7:
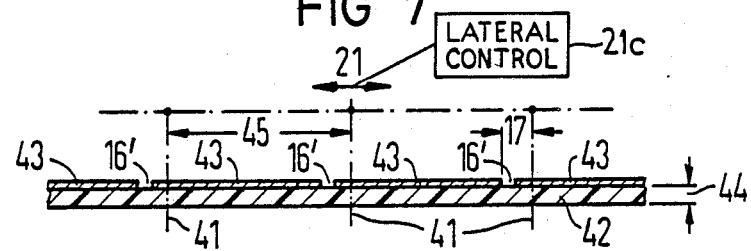
FIG. 7 is an elevational cross section of a metallized ply which forms a broad mother band showing indications for cutting of the mother band into individual bands in accordance with the present invention.
Figure 8:
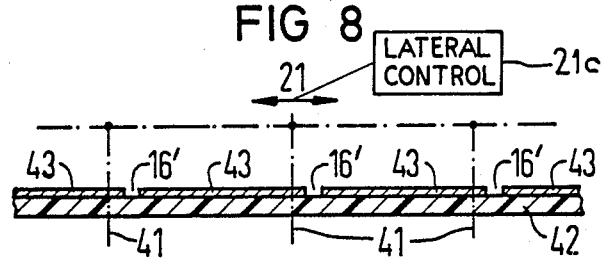
FIG. 8 is an elevational cross section of a broad mother band showing other indications for cutting into individual bands.

A further method of the present invention for modifying the overlap of metallized coatings on dielectric plies in accordance with the variation of the ply or foil thickness is shown in FIGS. 7 and 8. This method is directed to the provision of a mother band 42 which is later cut into individual bands having a band width 45 from which the capacitors are wound. The mother band 42 includes a plurality of metal coats 43 separated from one another by free zones 16'. The production of the free zones 16' is known. For example, a continuous metal coating can be eroded in individual locations with a plurality of grinding wheels so that the free zones 16 are formed. It is also possible to locally evaporate the metal coat with a laser beam so that the free zones 16 again arise. Other methods including masking and the like are also possible.

When the free zones 16 are produced without taking band thickness 44 into consideration, then it is within the scope of the present invention to consider the band thickness 44 when cutting the broad mother foil 42 into individual bands. Depending upon the band thickness 44, cutting lines 41 are laterally displaced in the directions 21 so that the active metal coated area becomes correspondingly larger for an upward transgression from the rated band thickness and, respectively, becomes correspondingly smaller for a downword transgression thereof. In subsequent winding of the individual bands manufactured in this way, the overlap that determines the active width of the metal coat will be greater or smaller than the rated overlap in accordance with fluctuations of the band thickness 44 from the rated band thickness.

Since, as may be derived from FIG. 3, the insulating edge 17 which has arisen due to the de-metallization means 14 or the free edge 18 which has arisen, for example, by grinding are arranged to the right or left of the active metal coat in alternation, the cutting lines 41 lie immediately to the right of the free zones 16' when cutting as shown in FIG. 7 or lie immediately to the left of the free zones 16' as shown in FIG. 8. A lateral control 21C is operable to move a known cutting means in accordance with variations in thickness of the plies to thereby cut the mother band 42 into individual bands.

As is known, bands which have thus been formed are then wound using standard methods to form either wound or stacked film capacitors. Variation of the overlap adapted to the different band thicknesses thereby derives on its own without further measures.

Although the present invention as been set forth with exemplary embodiments by reference to dielectric bands metalized on one side, analogous considerations which are within the command of a person skilled in the art to which the present invention applies are valid for dielectric bands metallized on both sides.

The invention of the present application can also be employed in capacitors that contain thin plastic layers above metal coats, wherein the thin plastic layers are produced by lacquering or in particular by glow polymerization as disclosed in U.S. Pat. No. 3,252,830 and German Published Application No. 36 29 837.

The dielectric plies or bands of the present invention can either be of plastic foil or of paper and are preferrably provided with regenerably thin metal coatings.

Although other modifications and changes may be suggested by those skilled in the art, it is the intention of the inventor to embody within the patent warranted hereon all achanges and modifications as reasonably and properly come within the scope of his contribution to the art.

I claim:

1. An electrical capacitor, comprising:
   a stack of at least two dielectric plies of plastic;
   regenerably thin metal coats on at least one side of said at least two dielectric plies;
   metal-free insulating strips provided on said at least two dielectric plies in alternation from ply to ply in proximity to different edge sides and at a distance therefrom;
   metal layers applied to said edge sides to contact said metal coats with opposite polarity from ply to ply;
   overlap of said metal coats being modified from a rated overlap of said metal coats in accordance with an equation $C = \epsilon\epsilon_o nL (u+\Delta u)/(d+\Delta d)$ to compensate for fluctuations from a prescribed rated thickness of said dielectric plies, where C is the capacitance of the capacitor, $\epsilon$ is the dielectric constant of the dielectric material used, $\epsilon_o$ is the dielectric constant of a vacuum, n is the number of plies of the film capacitor situated on top of one another, L is the length of the film capacitor defined by a parting cut, u is the lateral rated overlap, $\Delta u$ is the modification of the lateral rated overlap, d is the rated dielectric thickness and $\Delta d$ is the fluctuation of the rated dielectric thickness.

2. An electrical capacitor as claimed in claim 1, wherein said number n is inversely proportional to $(d+\Delta d)$ and said overlap $(u+\Delta u)$ is proportional to $(d+\Delta d)^2$ so that u/u is approximately equal to $2\Delta d/d$ to achieve approximately identical volumes of mass-produced capacitors.

3. An electrical capacitor, comprising:
   a winding of at least two dielectric plies provided with regenerably thin metal coats on at least one side of said plies;
   metal-free insulating strips provided in alternation from ply to ply in a proximity of different side edges of said at least two dielectric plies and at a distance from said different side edge;
   metal layers applied to said side edges in contact with said metal coats with opposite polarity from ply to ply;
   overlap of said metal coats being modified from a rated overlap of said metal coats according to an equation $C = \epsilon\epsilon_o nL (u+\Delta u)/(d+\Delta d)$ to compensate for fluctuations from a prescribed rated thickness of said dielectric plies, where C is the capacitance of the capacitor, $\epsilon$ is the dielectric constant of the dielectric material used, $\epsilon_o$ is the dielectric constant of a vacuum, n is the number of plies of the wound capacitor situated one on another, L is the circumference of the capacitor winding, u is the lateral rated overlaps, $\Delta u$ is the modification of the lateral rated overlap, d is the rated dielectric ply thickness, and $\Delta d$ is the fluctuation of the rated dielectric ply thickness.

4. An electrical capacitor as claimed in claim 3, wherein said number n is inversely proportional to $(d+\Delta d)$ and said overlap $(u+\Delta u)$ is proportional to $(d+\Delta d)^2$ so that $\Delta u/u$ is approximately equal to $2\Delta d/d$ to achieve approximately identical volumes of mass-produced capacitors.

5. A method of manufacturing an electrical capacitor formed by at least two dielectric bands having metal coats on at least one side the method comprising:
   capacitively measuring a thickness of at least one of said at least two bands provided with metal coats on at least one side before winding onto a capacitor winding;
   winding a capacitor winding with said bands onto a winding drum or winding spindle; and
   modifying lateral overlap of said bands in accordance with fluctuation of band thickness from a prescribed rated value.

6. A method as claimed in claim 5, further comprising:
   conducting at least one of said bands having said over an electrically conductive drum for said capacitive measuring, including:
   using said drum as a first electrode, and
   using said metal coat of said band as a second electrode.

7. A method as claimed in claim 5, further comprising:
   setting a width of said metal coat of at least one of said at least two bands with a de-metallization device so that said lateral overlap is proportional to said band thickness.

8. A method as claimed in claim 7, wherein said lateral overlap is linearly proportional to said band thickness.

9. A method as claimed in claim 7, wherein said lateral overlap is quadratically proportional to said band thickness.

10. A method as claimed in claim 5, further comprising:
  laterally offsetting said two bands lying on top of one another so that said lateral overlap is proportional to said band thickness.

11. A method as claimed in claim 10, wherein said lateral overlap is linearly proportional to said band thickness.

12. A method as claimed in claim 10, wherein said lateral overlap is quadratically proportional to said band thickness.

13. A method of manufacturing an electrical capacitor formed of at least two dielectric bands having metal coats on at least one side the method comprising:
  winding a plurality of the dielectric plies of bands on top of one another;
  comparing thickness of said plies to a rated thickness; and
  compensating deviation from an anticipated rated capacitance due to differences in thickness by modifying lateral overlap of said plies to be wound from a rated overlap on until an ultimate thickness is reached.

14. A method as claimed in claim 13, wherein said step of compensating deviation is repeatedly performed during manufacture of the capacitor by intermediate thicknesses measurements.

15. A method as claimed in claim 13, further comprising:
  setting a width of said metal coat of at least one of said at least two dielectric bands with a de-metallization device so that said lateral overlap is proportional to a band thickness.

16. A method as claimed in claim 15, wherein said lateral overlap is linearly proportional to said band thickness.

17. A method as claimed in claim 15, wherein said lateral overlap is quadratically proportional to said band thickness.

18. A method as claimed in claim 13, further comprising:
  laterally offsetting said at least two bands lying on top of one another so that said lateral offset is proportional to a band thickness.

19. A method as claimed in claim 18, wherein said lateral overlap is linearly proportional to said band thickness.

20. A method as claimed in claim 18, wherein said lateral overlap is quadratically proportional to said band thickness.

21. A method of manufacturing an electrical capacitor, comprising:
  providing a dielectric band as a mother band having a width amounting to a multiple of a width required for individual capacitors;
  providing said dielectric band with metal strips proceeding in a longitudinal direction;
  providing metal-free strips of substantially identical width and having identical spacing from one another, said metal-free strips being located between said metal strips;
  dividing said dielectric band into individual bands at cutting lines, said cutting lines being spaced a slight distance from an edge of said metal-free strips;
  laterally displacing said cutting lines depending on a thickness of said band so that a width of an active metal coat is proportional to said band thickness; and
  winding capacitors with said individual bands.

22. A method as claimed in claim 21, wherein said width of said active metal coat is linearly proportional to said band thickness.

23. A method as claimed in claim 21, wherein said width of said active metal coat is quadratically proportional to said band thickness.

* * * * *